United States Patent [19]

Pearson

[11] Patent Number: 5,028,940
[45] Date of Patent: Jul. 2, 1991

[54] CAMERA APPARATUS FOR MAGNETICALLY RECORDING ON FILM

[75] Inventor: Douglas H. Pearson, Rochester, N.Y.

[73] Assignee: Eastman Kodak Company, Rochester, N.Y.

[21] Appl. No.: 522,395

[22] Filed: Apr. 30, 1990

Related U.S. Application Data

[63] Continuation of Ser. No. 427,210, Oct. 24, 1989, abandoned, which is a continuation of Ser. No. 282,419, Dec. 9, 1988, abandoned.

[51] Int. Cl.$^5$ .............................................. G03B 29/00
[52] U.S. Cl. ....................................... 354/75; 354/105
[58] Field of Search .................... 354/75, 76, 105, 106

[56] References Cited

U.S. PATENT DOCUMENTS

| | | | |
|---|---|---|---|
| 4,270,853 | 6/1981 | Hatada et al. | 354/76 |
| 4,270,854 | 6/1981 | Stemme et al. | 354/76 |
| 4,500,183 | 2/1985 | Tanikawa | 354/21 |
| 4,613,911 | 9/1986 | Ohta | 360/3 |
| 4,642,717 | 2/1987 | Matsuda et al. | 360/105 |
| 4,689,696 | 8/1987 | Plummer | 358/333 |
| 4,705,372 | 11/1987 | Lapeyre | 354/106 |
| 4,736,215 | 4/1988 | Hudspeth et al. | 354/21 |
| 4,843,414 | 6/1989 | Yoshina | 354/21 |

*Primary Examiner*—Michael L. Gellner
*Attorney, Agent, or Firm*—Marianne J. Twait

[57] ABSTRACT

A photographic still camera includes a magnetic head for recording information on a magnetic surface of photographic film. The head is supported on a carriage which is mounted on a film platen for movement relative to the platen perpendicular to the longitudinal axis of the film. A spring mounted on the carriage is provided with spring arms that bias the carriage toward the longitudinal axis of the film so that a pair of pins extending from the carriage engage an edge of the film to maintain a precise relationship between the recorded information track and the film edge. A pressure pad carried by another arm of the spring urges the film into contact with the head. The platen carriage, head, spring and pressure head form a modular assembly which can be conveniently mounted into a photographic still camera.

17 Claims, 4 Drawing Sheets

CAMERA APPARATUS FOR MAGNETICALLY RECORDING ON FILM

This a continuation of application Ser. No. 07/427,210, filed Oct. 24, 1989, abandoned, which is a continuation of application Ser. No. 282,419, filed Dec. 9, 1988, abandoned.

CROSS REFERENCE TO RELATED APPLICATIONS

Reference is made to the following commonly assigned copending applications:

1. U.S. Pat. No. 4,947,196, entitled CAMERA APPARATUS FOR MAGNETICALLY RECORDING ON FILM, and issued Aug. 7, 1990 in the names of Michael L. Wash and Conrad Diehl.

2. U.S. Ser. No. 4,933,780, entitled CAMERA APPARATUS FOR MAGNETICALLY RECORDING ON FILM, and issued Aug. 12, 1990 in the names of Michael L. Wash and Christopher T. Mattson.

3. U.S. Pat. No. 4,996,546, entitled CAMERA APPARATUS FOR MAGNETICALLY RECORDING ON FILM, and issued Feb. 26, 1991 in the names of Daniel M. Pagano and Robert R. Cloutier.

4. U.S. Ser. No. 255,693, entitled FILM INFORMATION EXCHANGE SYSTEM USING DEDICATED MAGNETIC TRACKS OF FILM and filed Oct. 7, 1988 in the name of Robert P. Cloutier and William C. Atkinson.

5. U.S. Pat. No. 4,855,773, entitled MOTOR-DRIVEN FILM TRANSPORT APPARATUS, and issued ??? 8, 1989 in the name of Donald M. Harvey. U.S. Ser. Pat. 4,855,733 is incorporated into this application by reference.

6. U.S. Ser. No. 206,407, entitled, as amended, THREE PART DECODER CIRCUIT, and filed June 14, 1988 in the name of Michael L. Wash, now abandoned.

7. U.S. Pat. No. 4,912,467, entitled as amended, THREE PART ENCODER CIRCUIT, and issued Mar. 27, 1990 in the names of Arthur Whitfield and Michael L. Wash.

8. U.S. Pat. No. 4,876,697, entitled as amended, THREE PART DECODER CIRCUIT, and issued Oct. 24, 1989 in the name of Arthur Whitfield.

9. U.S. Ser. No. 206,646, entitled METHOD FOR MODULATING A BINARY DATA STREAM, and filed June 14, 1988 in the name of Michael L. Wash, now abandoned.

10. U.S. Pat. No. 4,878,075, entitled CAMERA APPARATUS FOR PREVENTING DOUBLE EXPOSURE and issued Oct. 31, 1989 in the name of James W. Cannon.

BACKGROUND OF THE INVENTION

This invention relates to magnetic recording apparatus for cameras and more particularly, to magnetic recording apparatus for photographic still cameras.

In commonly assigned copending application Ser. No. 255,693, entitled FILM INFORMATION EXCHANGE SYSTEM USING DEDICATED MAGNETIC TRACKS ON FILM, and filed Oct. 7, 1988 in the name of Robert P. Cloutier et al. there is disclosed a photographic film having a virtually transparent magnetic coating covering the non-emulsion side of the film and dedicated recording areas on the coating for recording information such as film type, film speed, film exposure information and information relevant to the processing and subsequent use (e.g. printing) of the film. The system thus provides for recording of information during film manufacture, reading and/or recording of information during camera use, and reading and/or recording of print related information during photofinishing. In the aforementioned copending application it is specifically proposed that camera information be recorded in spaced tracks preferably outside the image area along the edge of the film.

Reading and writing information on a magnetic coating or stripe on photographic film in a still camera requires solutions to problems different than those encountered in other apparatus. Perhaps the most significant problem is the space limitations in a portable hand held still camera which necessarily must be as compact and light as possible to appeal to the average consumer. Perhaps equally significant, however, is the characteristics of photographic film relative to more common recording mediums such as magnetic tape. Because photographic films are stiffer then magnetic tape and have varying degrees of curl both in the longitudinal and transverse directions depending upon the base materials and number and nature of sensitizing layers and environmental conditions, they present unusual problems in reading and writing information on a magnetic coating or stripe. To provide a reliable read or write signal the magnetic head must remain in close proximity to the magnetic coating. Any distrubances such as variations in film curl can vary the relationship of the head to the coating and decrease the reliability of the signal.

Another problem unique to compact photographic still cameras is that film advance occurs in a short period of time with a limited amount of motion and does not allow the steady state conditions normally associated with magnetic recording. Recording and playback must take place during transient conditions which tend to separate the film from the recording head. For optimum magnetic recording during these conditions, the magnetic head must maintain contact (i.e. within 10 micro-inches) with the magnetic coating.

Techniques for maintaining the desired relationship of the head to a magnetic coating in other apparatus, are not practical for use in a photographic still camera particularly a compact 35 mm camera. For example, in a sound movie camera, a film having a magnetic stripe along one edge is typically moved over a drum and information is recorded by a magnetic head positioned in close proximity to the drum. The drum provides a rigid support for the film, removes film curl and assures a uniform head to film relationship. While such a fixed support such as a sound drum produces satisfactory results, the space limitations in a photographic still camera render it impractical. Also, it is not suitable for the transient conditions described above.

Also, in a still camera system, it is desirable to record information pertinent to and coincident with images because negatives are cut up in photofinishing. In sound movie cameras, recorded information is displaced from the image to achieve continuous motion of the film during recording as compared with intermittent motion during exposure.

Another problem associated with magnetic recording in a compact photographic still camera is lateral displacement of the film during transport and recording caused by tolerance variations in the transport system and/or film edge non-uniformity. To compensate for these conditions which vary in severity from camera to camera, the width of the magnetic coating area dedicated to recording certain information in a track must be wider than would be the case without such lateral displacement. Similarly, equipment which reads the recorded information such as during photofinishing must be capable of reading information from a relatively wide dedicated track.

SUMMARY OF THE INVENTION

It is an object of the present invention to precisely locate a magnetic head relative to one edge of a photographic film so that the location of the recorded information track relative to the edge is precisely known.

In accordance with the invention, a magnetic head is carried by a support means which is biased by a biasing means into engagement with one edge of a photographic film. During film transport, the biasing means maintains the support means and the head in a precise location relative to the film edge so that the recorded information track has a more exact location relative to the film edge.

Another feature of the invention resides in the assembly of a head, support means, biasing means and film platen as a module that can be simply mounted into a camera to provide magnetic recording capability.

BRIEF DESCRIPTION OF THE DRAWINGS

Other advantages of the invention will become apparent from the following description taken in connection with the accompanying drawings wherein.

DETAILED DESCRIPTION OF THE INVENTION

Figure 1:
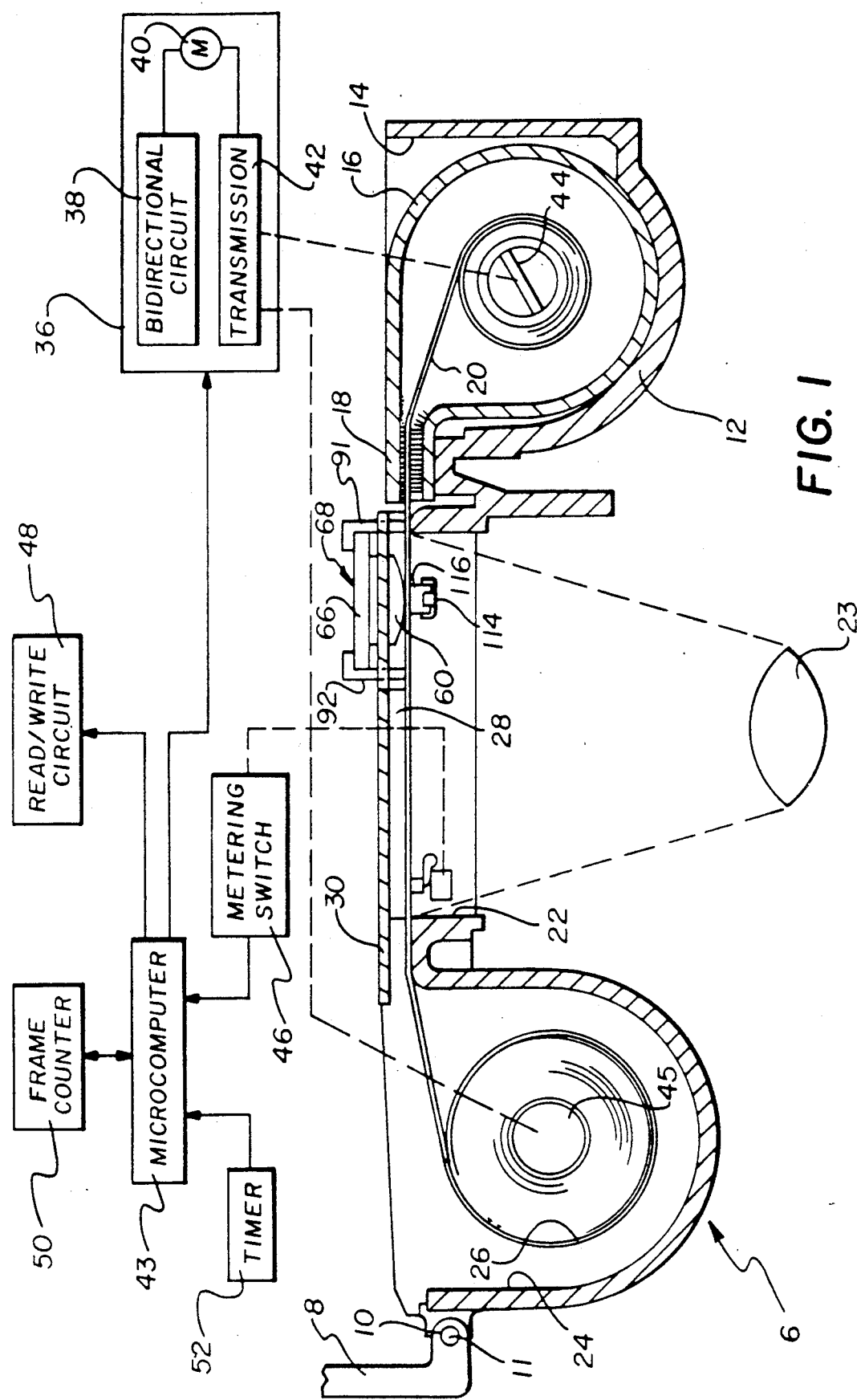
FIG. 1 is a cross section of a portion of a conventional photographic still camera illustrating a portion of the magnetic recording apparatus in accordance with the invention.
Figure 2:
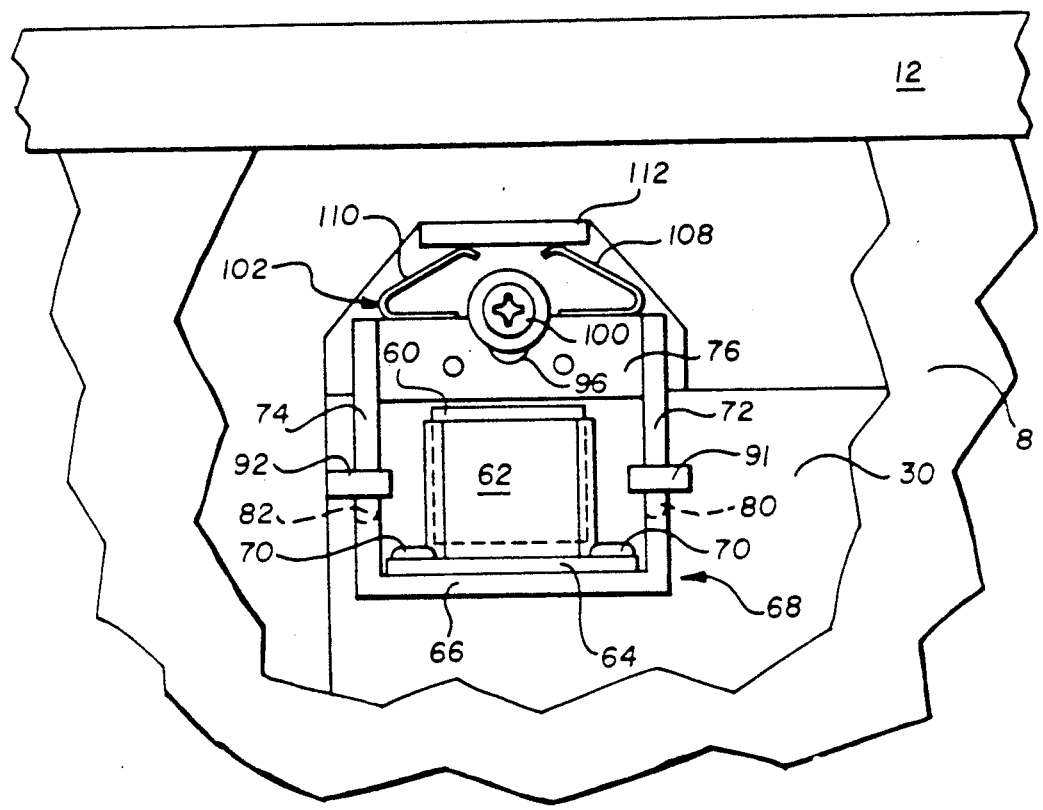
FIG. 2 is a fragmentory view of the back or door for the camera illustrated in FIG. 1 cut away to illustrate the platen and recording module.
Figure 3:
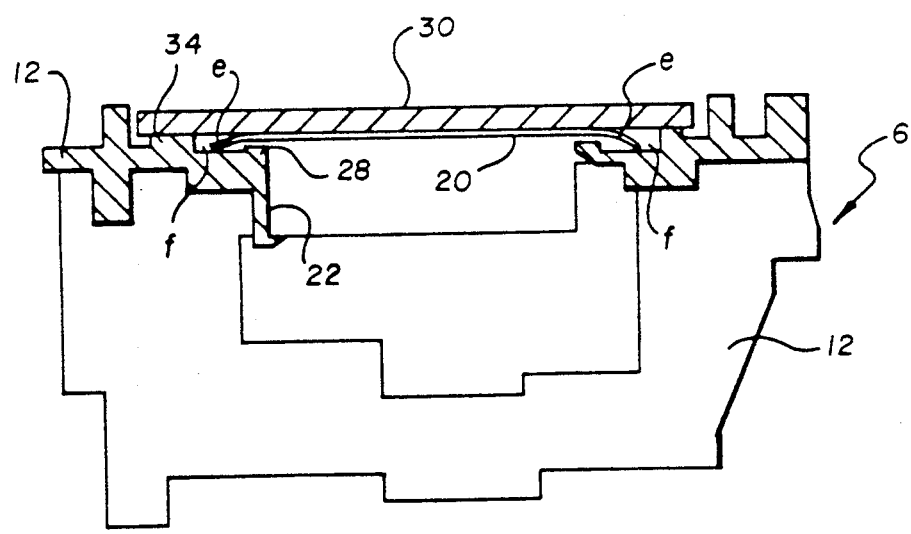
FIG. 3 is a cross section taken perpendicular to the section shown in FIG. 1.

Referring to FIGS. 1, 2 and 3 of the drawings, there is shown a portion of a typical photographic still camera 6 having a back or rear door 8 (FIG. 2) pivotal to an open position by means of a pair of pins 10 one of which is shown in FIG. 1. The pins 10 are received in holes 11 in frame 12. Since such cameras are well known in the art, features not necessary for an understanding of the present invention have been omitted or shown in block diagram to simplify the disclosure. Also, the invention will be described with reference to a single magnetic head. However, it is to be understood that a camera can be provided with a plurality of heads for multi-track recording.

Figure 4:
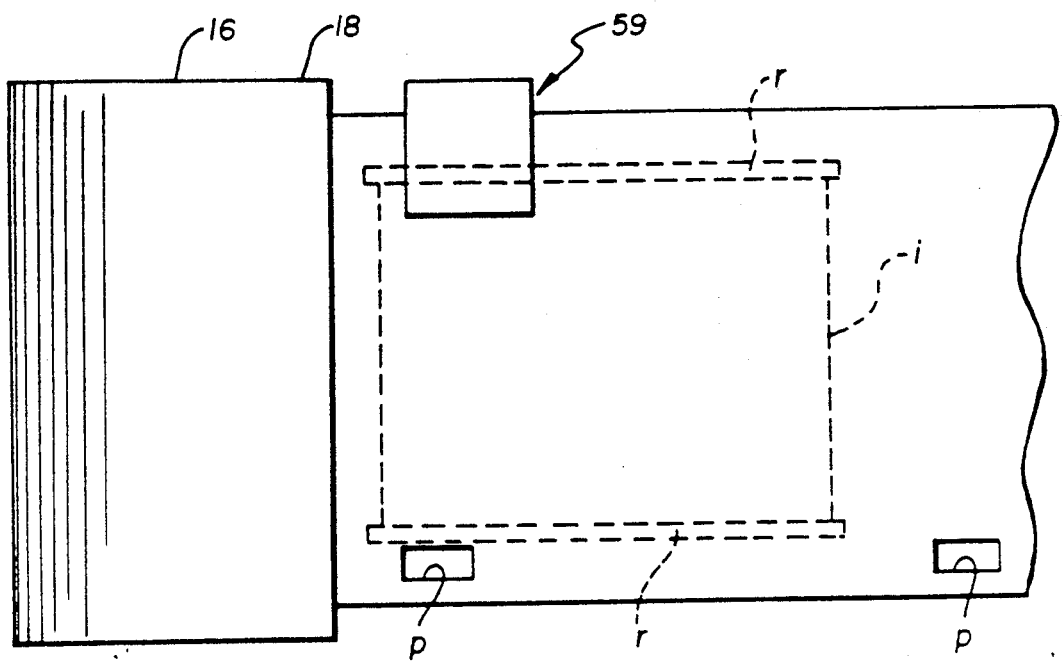
FIG. 4 is an enlarged top view of the film cartridge shown in FIG. 1 with the film partially withdrawn and the location of the recording module indicated schematically.

The camera 6 comprises a body or housing 12 having a chamber 14 at one end thereof for receiving a film cartridge 16. The cartridge 16 which is shown more clearly in FIG. 4, preferably takes the form of the film cartridge disclosed in U.S. Pat. No. 4,855,773 having a lip 18 from which a film 20 is removed for exposure. The film 20 is provided with a transparent magnetic coating 21 on its non-emulsion side, a single row of perforations (p) along one edge and dedicated longitudinal recording areas (r) along the edges outside the image area (i). As disclosed in copending application Ser. No. 255,693, filed Oct. 7, 1988 in the name of Robert P. Cloutier et al. and entitled FILM INFORMATION EXCHANGE SYSTEM USING DEDICATED MAGNETIC TRACKS ON FILM, the areas (r) would be dedicated areas for recording information in the camera, the image area being dedicated to the recording of photofinishing information.

It will be apparent, however, that the recording apparatus disclosed herein is equally applicable to magnetic coatings or stripes on conventional 35 mm film, and that the camera apparatus disclosed herein can alternatively be a conventional 35 mm camera such as the commercially available KODAK K-14 Medalist VR 35 camera.

As is well known in the art, the surfaces of cartridge 16 and lip 18 engage complimental surfaces of the chamber 14 and the camera back whereby when the camera back is closed, the cartridge is fixedly held in the orientation shown in FIG. 1. Since such camera and cartridge interface features are well known in the art, further description is deemed unnecessary.

From the lip 18, the film 20 is transported across a rectangular exposure opening 22 aligned with a taking lens 23 to a film take-up chamber 24 where it is wound on a take-up spool 26. Mechanisms for accomplishing such film transport are well known in the art. Typically, they operate to advance the film frame by frame from the cartridge to the take-up spool, or if the camera exposes during rewind, frame by frame from the take-up spool to the cartridge.

A pair of film rails 28 are formed on opposite sides of the rectangular exposure opening 22 to engage the longitudinal edges of the film. The film 20 is urged toward the rails 28 by a platen 30 mounted on a leaf spring on the camera back 8. The platen 30 comprises a generally flat rectangular plate having planar dimensions complimental to the rectangular exposure opening 22 whereby upon closure of the back, platen 30 will engage platen support surfaces 34, engage the film 20 and urge it with slight pressure toward rails 28 under the influence of leaf spring (not shown). See FIG. 3. The platen 30 will tend to remove longitudinal curl resulting from film core set in the cartridge 16 and some of the transverse curl across the film. However, since the film is unsupported transversely on its emulsion side, some transverse curl still exists during film exposure as indicated in FIG. 3 at areas (e) but not enough to noticeably degrade the image.

In a typical still camera, the spacing between the platen 20 and the rails 28 is in the range of 0.25–0.45 mm as a result of manufacturing tolerances. The photographic film used in such a camera is typically 0.15 mm thick. Accordingly, as shown in FIG. 3, the film may not actually engage the rails. Due to the transverse film curl, the extreme edges of the film may actually engage the camera surfaces (f) on the other side of the rails with the curl bias causing most of the width of the film to engage the platen. Because of this result, the camera lens is typically focused on a film plane next to the platen.

FIG. 1 also depicts in a block diagram some of the more basic central features of cameras of the type described. Typically, a motorized film transport means 36 comprising a conventional bi-directional circuit 38 for reversing a drive motor 40, a drive transmission 42 and drive hubs 44 and 45 which engage the core of film cartridge 16 and the take-up spool 26 respectively, is provided for rotating the spool core and the take-up spool either in the unwinding or winding directions under the control of a micro computer 43.

Other elements of the camera include a conventional metering switch 46, a read/write circuit 48, a shutter release mechanism, a conventional digital frame counter 50 and a conventional timer 52. These components are all controlled from the micro computer 43 in a manner well known in the art and since they form no part of the present invention, further description is deemed unnecessary.

As mentioned above, magnetic recording in photographic still cameras involves unique problems. Film advance occurs in a short period of time with a limited amount of motion and does not allow the steady conditions normally associated with magnetic recording to be achieved. In view of these problems, the read/write circuit 48 preferably utilizes the encoding and decoding techniques disclosed in the referenced commonly assigned copending application U.S. Ser. No. 206,407, now abandoned and U.S. Pat. Nos. 4,912,467 and 4,876,697206,553, and the code format preferably takes the form of that disclosed in the referenced copending application Ser. No. 206,646, now abandoned.

Figure 6:
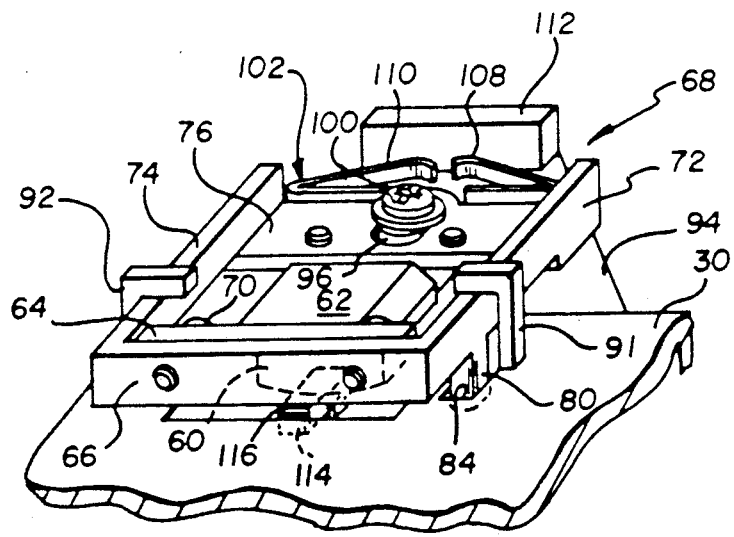
FIG. 6 is a perspective view of the assembled module shown in FIG. 5.
Figure 5:
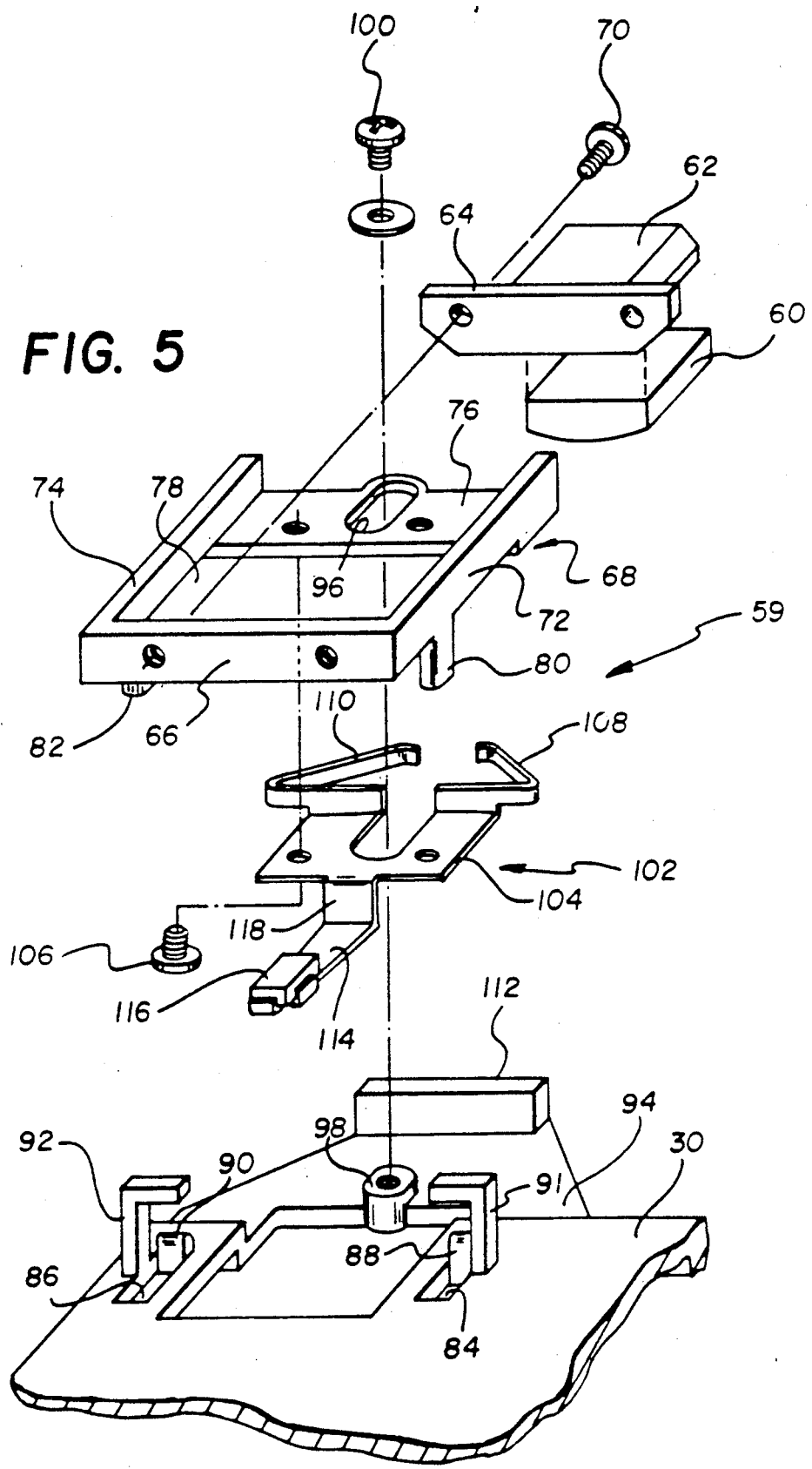
FIG. 5 is an exploded perspective view illustrating a module assembly in accordance with the invention.

Referring to FIGS. 2, 5 and 6 and most specifically to FIGS. 5 and 6, there is shown a recording module assembly 59 in accordance with the invention. The module 59 comprises a conventional rectangular magnetic read/write head 60 connected to the read/write circuit 48 is mounted such as with an adhesive on the underside of a head supporting member 62. The supporting member 62 is provided with an end flange 64 adapted to be attached to the end wall 66 of a head carriage 68 by screws 70.

The carriage 68 generally comprises a rectangular frame having, in addition to end wall 66, side walls 72 and 74 and a partial bottom wall 76. The walls 66, 72, 74 and 76 define an opening 78 into which the supporting member 62 will be received when its flange 64 is attached to end wall 66 of frame 68. When the supporting member is so positioned the head 60 will be positioned to engage the film when the platen 30 is in its operative position in the camera.

The frame 68 is additionally provided with a pair of depending pins 80 and 82 extending downward from the side walls 72 and 74 respectively. The pins 80 and 82 are received by a pair of elongated slots 84 and 86 in the film platen 30 which permit relative movement of the carriage relative to the platen and the longitudinal axis of the film. The lower surfaces of the side walls 72 and 74 rest on raised bearing surfaces 88 and 90 of the platen 30. A pair of upstanding guides 91 and 92 on the platen 30 engage the upper surfaces of side walls 72 and 74.

The bottom wall 76 engages and rides on surface 94 of platen 30. An elongated slot 96 in the bottom wall 76 receives an elongated boss 98. A screw 100 is inserted through slot 96 and threaded into boss 98 to retain the bottom wall 76 to surface 94 while permitting movement of the boss 98 in slot 96 during movement of the carriage.

To complete the module assembly, a biasing means comprising a spring 102 is mounted on the carriage to bias the carriage toward the longitudinal axis of the film. Spring 102 comprises a flat central portion 104 attached to the underside of bottom wall 76 by screws 106. A pair of leaf spring arms 108, 110 extending at angles in their relaxed positions from the rear end of central portion 104. In the assembly module spring arms are displaced toward the central portion 104 and engage an abutment 112 on the platen 30 causing the carriage to be biased away from the abutment 112.

A spring arm 114 on the other end of the central portion carries a pressure pad 116 adapted to engage the under surface of the film to urge the opposite magnetic coated surface into engagement with the head 60. An offset 118 is provided to create the desired relative positions. The spring force provided by arm 114 will cause contact between pad 116 and head 60 when film is not in the film path. However, the spring force will be light enough to permit automatic threading of the film between the head and pad.

In operation of the assembled module, pins 80 and 82 will engage the edge of the film under the bias of spring arms 108, 110 during film transport and magnetic recording to cause the module assembly comprising carriage 68, support 62, head 60 and pressure pad 116 to be positioned in precise alignment with the edge of the film. Any displacement of the film or variation in the edge contour will cause the carriage to be displaced to maintain the recorded information track in aligned relationship with the head. The freedom of movement of the carriage is provided by slots 84, 86 and 96. The vertical position of the carriage is determined by surfaces 88, 90, guides 91, 92, screw 100 and surface 94. The latter parts are dimensioned to provide adequate freedom of movement of the carriage perpendicular to the film longitudinal axis.

The modular construction of the carriage spring and head assembly has numerous advantages. The entire assembly can be pre-assembled on the film platen which can be inserted into and attached to the camera in a simple manner. This approach offers the advantage of producing standardized recording from camera to camera employing such modules and the advantage of being able to partially expose and record a film in one camera and complete its exposure in another camera. If the modules are identical, equipment for reading the recorded information would see the track in essentially the same exact location for all cameras and would properly read information recorded by any camera.

For simplicity, the magnetic head 60 has been shown mounted in a plane parallel to the film axis. Preferrably, however, it would be inclined slightly relative to the film plane to approximate the film inclination resulting from film curl as disclosed in copending application U.S. Pat. No. 4,996,546 the disclosure of which is incorporated by reference.

For simplicity, the invention has also been disclosed with respect to a single magnetic head. It will be apparent, however, that the platen 30 could be provided with additional head assemblies identical to the assembly disclosed herein for simultaneously recording information on a plurality of tracks.

While the invention has been shown and described with reference to a preferred embodiment thereof, it will be apparent that various changes may be made without departing from the scope of the invention as defined by the appended claims.

I claim:

1. A photographic still camera for transporting a photographic film past an exposure position to expose frames of the film, the film having a magnetic surface for magnetically recording information on the film, said camera comprising:
- a camera body;
- a magnetic head for recording information on the magnetic surface; and
- means for supporting said magnetic head within said body, said supporting means having a surface engageable with the edge of the film to maintain a substantially constant orientation of the head with the edge of the film.

2. A photographic still camera for transporting a photographic film past an exposure position to expose frames of the film, the film having a magnetic surface for magnetically recording information on the film, said camera comprising:
- a camera body;
- a magnetic head for recording information on the magnetic surface;
- means movable perpendicular to the longitudinal axis of the film for supporting said magnetic head within said body adjacent said magnetic surface; and
- means for biasing said supporting means into engagement with an edge of the film during magnetic recording to maintain a constant spacing between said head and the edge whereby information is recorded by said head in a track having a precise spaced relationship with the edge of the film.

3. A photographic still camera as claimed in claim 2 further including an exposure opening in said camera body;
- a film platen supported by said camera body to engage the film and hold it in an exposure plane adjacent said exposure opening; and
- means for movably mounting said head supporting means on said platen.

4. A photographic still camera as claimed in claim 3 wherein said means for supporting said head comprises a carriage.

5. A photographic still camera as claimed in claim 4 wherein said carriage comprises abutment means for engaging the edge of the film.

6. A photographic still camera as claimed in claim 5 wherein said carriage comprises a frame having a pair of side walls, a bottom wall and at least one rear wall; said camera further including guide means on said platen adjacent said side walls for permitting rectilinear movement of said carriage relative to the longitudinal axis of the film.

7. A photographic still camera as claimed in claim 6 wherein said head is supported on said rear wall of said carriage.

8. A photographic still camera as claimed in claim 7 wherein said platen includes a pair of openings beneath said side walls and said abutment means comprises a pair of pins depending from said side walls respectively and extending through said openings to engage the film edge.

9. A photographic still camera as claimed in claim 8 wherein said biasing means comprises a spring member attached to said bottom wall.

10. A photographic still camera as claimed in claim 9 wherein said platen has an abutment surface and wherein said spring member includes a pair of leaf spring arms adapted to engage said abutment.

11. An assembly for a photographic still camera adapted to expose frames of a photographic film, the film having a magnetic surface for recording information on the film, said assembly comprising:
- a platen adapted to be mounted in said camera to engage the film and retain it in an exposure position;
- a magnetic head mounted on said platen;
- a pressure pad mounted on said platen; and
- means for biasing said pressure pad toward said head.

12. An assembly as claimed in claim 11 further including a carriage mounted on said platen for movement relative to the longitudinal axis of the film;
- means for supporting said head on said carriage; and
- abutment means on said carriage adapted to engage the edge of the film when said assembly is mounted in said camera.

13. An assembly as claimed in claim 12 further including means for biasing said carriage to effect engagement of said film by said abutment means.

14. A photographic apparatus having means for accepting a photographic material, the photographic material having a magnetic surface for magnetically recording information on the film, said apparatus comprising:
- a magnetic head for recording and/or reading information on the magnetic surface; and
- means for supporting said magnetic head within the photographic apparatus, said supporting means having a surface engageable with an edge of the photographic material to maintain a substantially constant orientation of the head with the edge of the material.

15. A photographic apparatus having means for accepting a sheet or strip of photographic material having a longitudinal axis, the photographic material having a magnetic surface for magnetically recording information on the film, said apparatus comprising:
- a support;
- a magnetic head for recording and/or reading information on the magnetic surface;
- means movable perpendicular to the longitudinal axis of the photographic material for positioning said magnetic head relative to said support adjacent said magnetic surface; and
- means for biasing said supporting means into engagement with an edge of the material during magnetic recording and/or reading to maintain a constant spacing between said head and the edge whereby information is recorded and/or read by said head in a track having a precise spaced relationship with the edge of the material.

16. A photographic apparatus as claimed in claim 15 wherein said means for positioning said head comprises a carriage.

17. A photographic apparatus as claimed in claim 16 wherein said carriage comprises abutment means for engaging the edge of the material.

* * * * *